United States Patent [19]

Brumbaugh

[11] 4,257,400
[45] Mar. 24, 1981

[54] COMBINED ROOF AND SOLAR HEAT STRUCTURE

[76] Inventor: Lloyd E. Brumbaugh, 766 S. Johnson Rd., Ludlow Falls, Ohio 45339

[21] Appl. No.: 59,477

[22] Filed: Jul. 20, 1979

Related U.S. Application Data

[63] Continuation of Ser. No. 735,778, Oct. 26, 1976, abandoned.

[51] Int. Cl.³ .................................................. F24J 3/02
[52] U.S. Cl. ..................................... 126/438; 126/439
[58] Field of Search ............... 126/438, 439, 450, 432; 350/292, 293, 298, 299; 165/49, 53

[56] References Cited

U.S. PATENT DOCUMENTS

| | | | |
|---|---|---|---|
| 3,179,105 | 4/1965 | Falbel | 126/438 |
| 3,254,643 | 6/1966 | Thomason | 126/432 |
| 3,563,305 | 2/1971 | Hay | 126/429 |
| 3,841,302 | 10/1974 | Falbel | 126/439 |
| 3,994,278 | 11/1976 | Pittinger | 126/422 |
| 4,015,585 | 4/1977 | Fattor | 126/438 |
| 4,018,211 | 4/1977 | Barr | 126/439 |
| 4,020,827 | 5/1977 | Broberg | 126/438 |

OTHER PUBLICATIONS

I. R. Barr, "Solar Heating Experiment Timonium Elementary School Timonium, Maryland," National Science Foundation Research Applied to National Needs, Jun. 1974, pp. 56–63.

*Primary Examiner*—James C. Yeung
*Attorney, Agent, or Firm*—Kemon & Estabrook

[57] ABSTRACT

A combined roof and solar heat collector includes a hollow box structure open at the top and presenting to the normal street viewer, the general appearance of a mansard-type roof. A row of heat collector panels in a common plane generally facing the direction of the sun is arranged within and adjacent one side of the box-like structure. A reflector surface extends from the base of the row of panels to the upper opposite edge of the box, and a rain gutter is positioned at the lowest portion of the reflector surface.

5 Claims, 4 Drawing Figures

COMBINED ROOF AND SOLAR HEAT STRUCTURE

This is a continuation, of application Ser. No. 735,778, filed Oct. 26, 1976, abandoned.

BACKGROUND OF THE INVENTION

With the present ongoing energy crisis, there is a substantial interest in solar heat devices, either as a substitute for or a supplement to conventional heating systems in both domestic and commercial buildings. One of the drawbacks to solar heating systems which has plagued architects and other designers in this field is the fact that the heat collector panels which must be of substantial size, are unsightly and whether they are roof mounted or mounted adjacent to the structure to be heated, such structures to date have been aesthetically unacceptable. Another difficulty is that such panels when exposed to view of the general public seem to attract acts of vandalism. Accordingly, it is the principal object of the present invention to provide a combined roof and solar heat panel collector structure which to all outward appearances is a conventional roof since the solar panels are hidden from the normal street view.

BRIEF SUMMARY OF THE INVENTION

In accordance with the present invention, a building for a roof comprises a box-like structure open at the top and which preferably presents to the normal street-level viewer the general appearance of a mansard-type roof. The heat collector panels and a cooperating reflector surface are arranged within the box and below the level of the upper edges thereof in a compact unitary and aesthetically pleasing arrangement.

DETAILED DESCRIPTION

Figure 1:
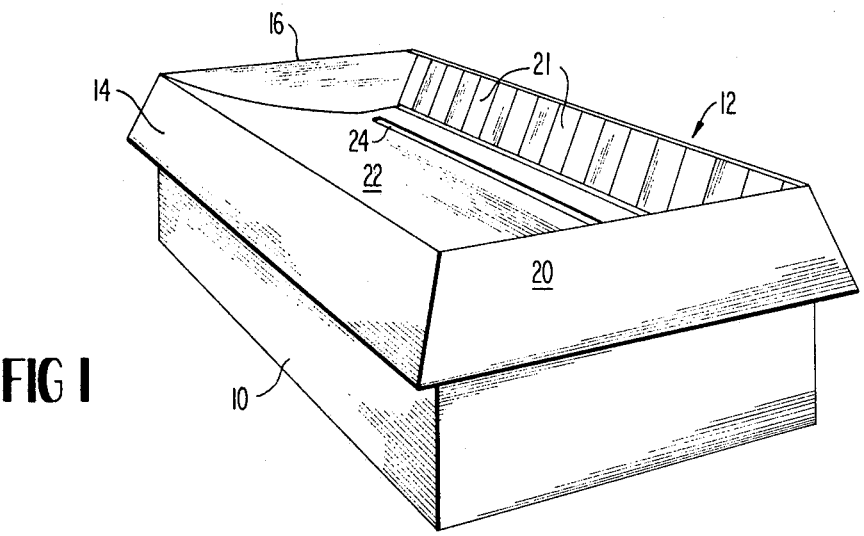
FIG. 1 is a perspective view of a roof and solar heat panel structure in accordance with the present invention.

Referring to FIG. 1, a building 10 which may be either a dwelling or commercial structure is surmounted by a roof structure in accordance with the present invention and identified generally by the reference numeral 12. As shown, the roof 12 is basically an open-topped box having four sloping side walls 14, 16, 18 and 20 which present the general outward appearance of a mansard-type of roof. Arranged along one long side 18 are a row of solar heat collector panels 21 arranged in a common plane. The angle of the plane to the vertical will vary depending upon the geographical location of the building, but in general the angle is such that the panels generally face toward the apparent path of the sun in order to subject them to the maximum amount of solar radiation during each daylight hour. The remaining portion of the interior of the box is substantially covered by a reflector surface 22 which extends from the base of the row of panels 20 to the upper opposite edge of the side member 14. At substantially the lowest point of the reflector surface, a drainage means in the form of a rain gutter is positioned to extend parallel to the row of panels and substantially across the entire length of the roof. The overhang of the roof is preferably closed by a soffit as at 26.

Figure 2:
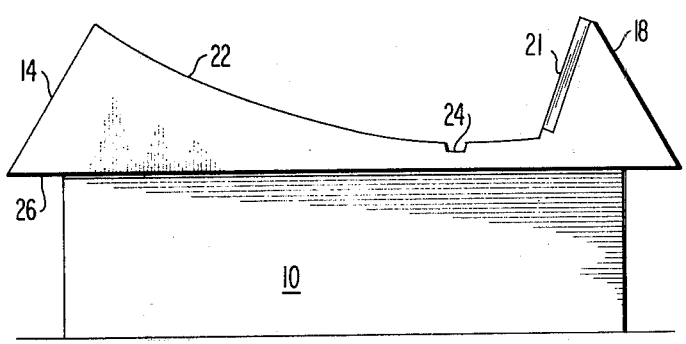
FIG. 2 is a side section of the roof shown in FIG. 1.
Figure 3:
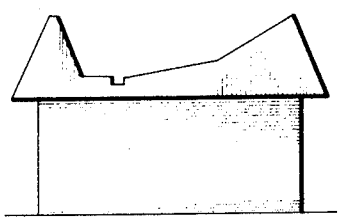
FIGS. 3 and 4 are views similar to FIG. 2, but showing alternate reflector surface configurations.
Figure 4:
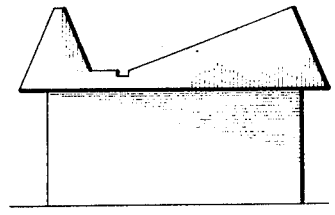

FIGS. 3 and 4 are substantially the same as FIG. 2 but simply show variations in the configuration of the reflector surface. FIG. 3 shows a double plane surface approximating the curved surface of FIG. 2 whereas FIG. 4 is essentially a single plane reflector surface.

Preferably, the reflector surface 22 is covered with aluminum sheet or some other suitably reflective material to achieve a maximum concentration of solar energy of the panels 20. Also, the angle of the reflective surface should be such that optimum performance of the reflector will occur at approximately the time when the heat demand for the building is the greatest. In northern latitudes this is generally during the month of January.

From the foregoing it will be apparent to those skilled in this art that there is herein shown and described a new and useful combination roof and solar heat panel structure, and while a preferred embodiment is disclosed, applicant claims the benefit of a full range of equivalents within the scope of the appended claims.

I claim:

1. An integral building roof and solar heat collector structure comprising in combination:
    a hollow rectangular box-like structure, closed at the bottom, open at the top, having its long axis oriented approximately in an east-west direction, and having outer sides which form peripheral roof surfaces so as to shed water and present from normal street level view the general appearance of a mansard-type roof;
    a row of solar heat collector panels arranged in a common plane, with their tops parallel to and joined with the upper part of the north side of said peripheral roof surface, and with their bottoms at the bottom of said box-like structure;
    a combination roof-reflector surface joining directly to the lowermost portion of said panels and extending to and joining directly to the upper part of the south side of said peripheral roof surface; and
    means for draining water from the lowest portion of said combination roof-reflector surface.

2. An integral building roof and solar heat collector structure comprising in combination:
    a rectangular roof having its long axis oriented approximately in an east-west direction and including an inner or central portion which sheds its water toward an interior drain and an outer portion, said outer portion consisting of peripheral roof surfaces which shed water to the outside and present from normal street level view the general appearance of a mansard-type roof;
    a row of solar heat collector panels arranged in a common plane within said inner or central portion and with their tops parallel to and joined with the upper part of the north side of said peripheral roof surface and with their bottoms at a level near the lowermost part of said inner or central portion;
    a combination roof-reflector surface arranged within said inner or central portion, joined directly to the lowermost part of said panels and extending to and joining directly with the upper part of the south side of said pheripheral roof surface; and
    means for draining water from the lowest portion of said combination roof-reflector surface.

3. The combination defined by claim 2 in which said roof-reflector surface is curved.

4. The combination defined by claim 2 in which said roof-reflector surface lies in a single plane.

5. The combination defined by claim 2 in which said roof-reflector surface is formed of at least two planes positioned at angles to each other to approximate a curved surface.

* * * * *

UNITED STATES PATENT AND TRADEMARK OFFICE
CERTIFICATE OF CORRECTION

PATENT NO. : 4,257,400

DATED : March 24, 1981

INVENTOR(S) : Lloyd E. Brumbaugh

It is certified that error appears in the above—identified patent and that said Letters Patent is hereby corrected as shown below:

Column 1, line 65, "20" should read -- 21 --.

Column 1, line 68, after "gutter" insert -- 24 --.

Column 2, line 12, "20" should read -- 21 --.

In the drawings delete Figure 1 and substitute the attached Figure therefore.

UNITED STATES PATENT AND TRADEMARK OFFICE
CERTIFICATE OF CORRECTION

PATENT NO. : 4,257,400

DATED : March 24, 1981

INVENTOR(S) : Lloyd E. Brumbaugh

It is certified that error appears in the above—identified patent and that said Letters Patent is hereby corrected as shown below:

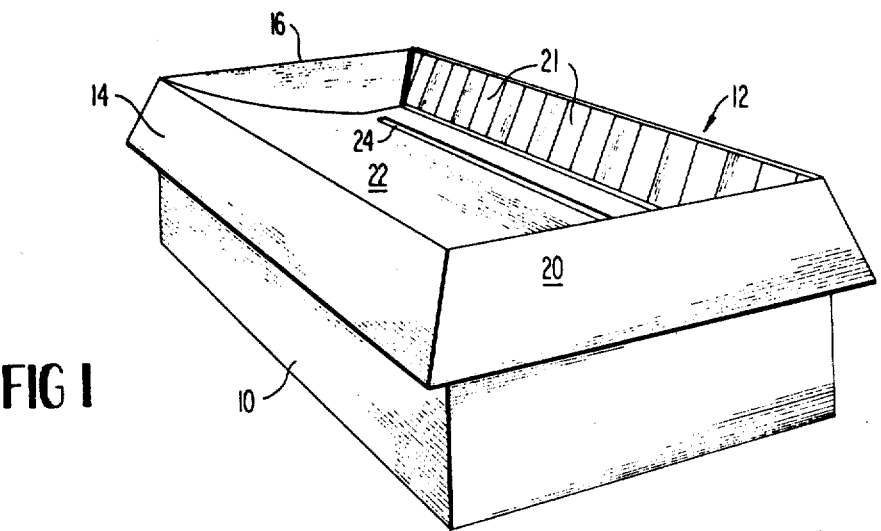

FIG I

Signed and Sealed this

Third Day of November 1981

[SEAL]

Attest:

Attesting Officer

GERALD J. MOSSINGHOFF

Commissioner of Patents and Trademarks